United States Patent
Bishop et al.

(10) Patent No.: US 7,729,270 B2
(45) Date of Patent: Jun. 1, 2010

(54) METHOD FOR SUPPORTING ON-DEMAND PERFORMANCE

(75) Inventors: Ellis Edward Bishop, Austin, TX (US); Randy Scott Johnson, O'Fallon, MO (US); James Michael Kenley, Erie, CO (US); Tedrick Neal Northway, Wood River, IL (US); H. William Rinckel, Prospect, CT (US); Clea Anne Zolotow, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/034,905

(22) Filed: Jan. 13, 2005

(65) Prior Publication Data

US 2006/0153090 A1 Jul. 13, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................................ 370/252; 370/229

(58) Field of Classification Search ................ 370/252, 370/241, 242, 229; 709/203, 224
See application file for complete search history.

(56) References Cited

U.S. PATENT DOCUMENTS

| | | | |
|---|---|---|---|
| 5,210,872 A | 5/1993 | Ferguson et al. ............ 395/650 |
| 5,850,388 A * | 12/1998 | Anderson et al. ........... 370/252 |
| 5,918,207 A | 6/1999 | McGovern et al. | |
| 5,963,910 A | 10/1999 | Ulwick | |
| 6,023,681 A | 2/2000 | Whitt | |
| 6,086,628 A | 7/2000 | Dave et al. ...................... 716/7 |
| 6,178,542 B1 | 1/2001 | Dave ............................ 716/18 |
| 6,209,033 B1 | 3/2001 | Datta et al. | |
| 6,307,546 B1 | 10/2001 | Wickham et al. | |
| 6,363,053 B1 | 3/2002 | Schuster et al. | |
| 6,460,173 B1 | 10/2002 | Schreiber ..................... 716/18 |
| 6,625,577 B1 | 9/2003 | Jameson | |

(Continued)

OTHER PUBLICATIONS

USPTO office action for U.S. Appl. No. 10/825,025 dated Apr. 1, 2009.

(Continued)

*Primary Examiner*—Ricky Ngo
*Assistant Examiner*—David Oveissi
(74) *Attorney, Agent, or Firm*—Yee & Associates, P.C.; William H. Steinberg; Rudolf O. Siegesmund

(57) ABSTRACT

A method is disclosed for managing the performance of shared computing resources in furtherance of delivering on-demand IT services to multiple customers. The inventive method comprises predicting the performance of resources allocated among the customers to minimize performance related problems; preventing performance related problems by evaluating the impact of changes in resource allocations; reacting to performance alerts to resolve performance related problems; and determining the appropriate level of resource performance needed in service level agreements, and that these requirements detailed in the service level agreements are achieved. This Performance Management method ensures that the demands of the customers are not affected by the allocation and utilization of the shared IT resources.

3 Claims, 13 Drawing Sheets

U.S. PATENT DOCUMENTS

| | | |
|---|---|---|
| 6,711,137 B1 * | 3/2004 | Klassen et al. ............... 370/252 |
| 6,831,890 B1 * | 12/2004 | Goldsack et al. ............ 370/229 |
| 6,853,932 B1 | 2/2005 | Wichelman et al. |
| 6,904,265 B1 | 6/2005 | Valdivia et al. |
| 6,996,601 B1 * | 2/2006 | Smith .......................... 709/203 |
| 7,305,431 B2 | 12/2007 | Karnik et al. |
| 7,463,648 B1 | 12/2008 | Eppstein et al. |
| 7,499,844 B2 | 3/2009 | Whitman, Jr. |
| 2004/0062205 A1 * | 4/2004 | Friskney et al. ............. 370/252 |
| 2004/0064557 A1 | 4/2004 | Karnik et al. |
| 2004/0228363 A1 | 11/2004 | Adamczyk et al. |
| 2005/0259683 A1 | 11/2005 | Bishop et al. |

OTHER PUBLICATIONS

USPTO office action for U.S. Appl. No. 10/825,025 dated Oct. 16, 2009.

* cited by examiner

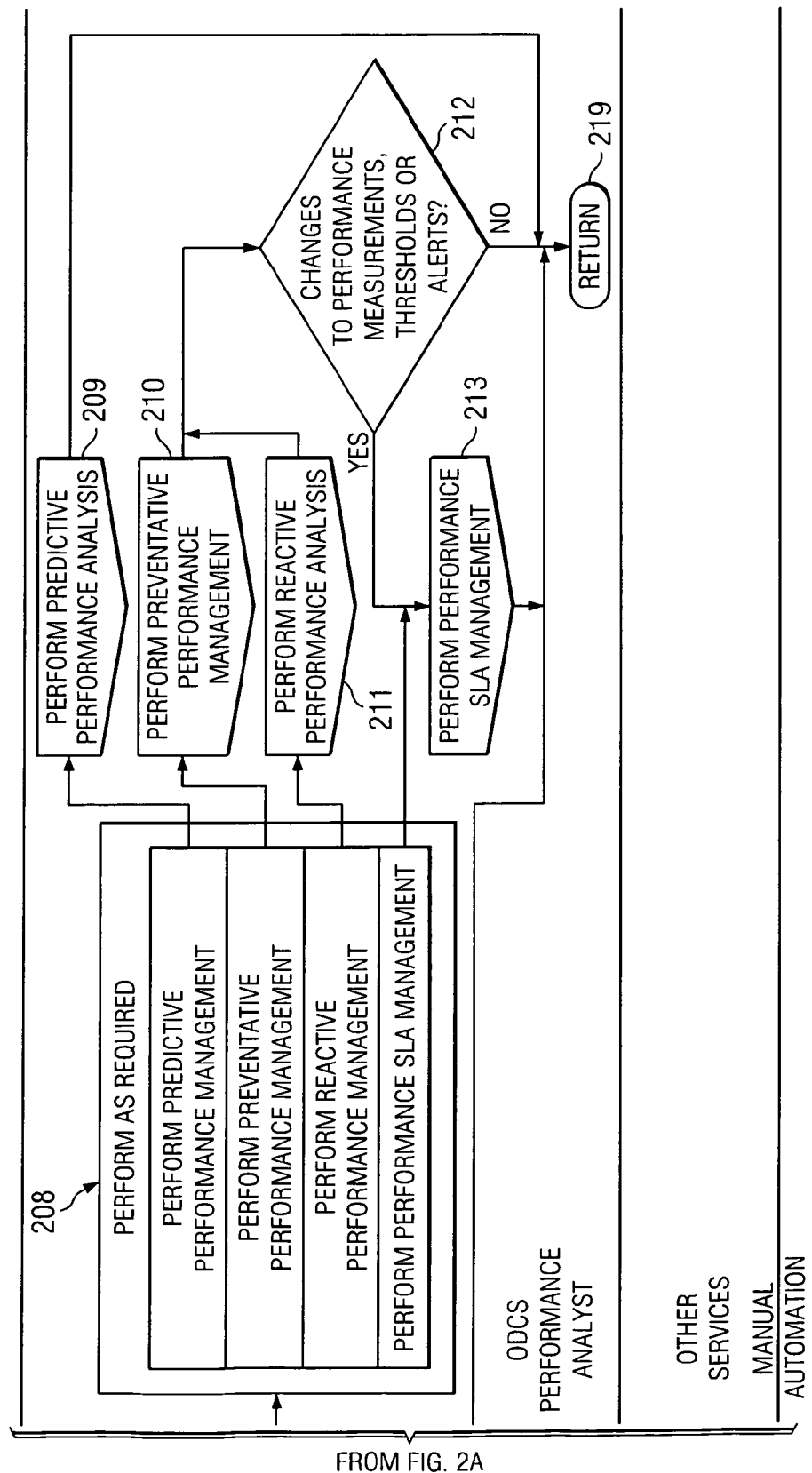

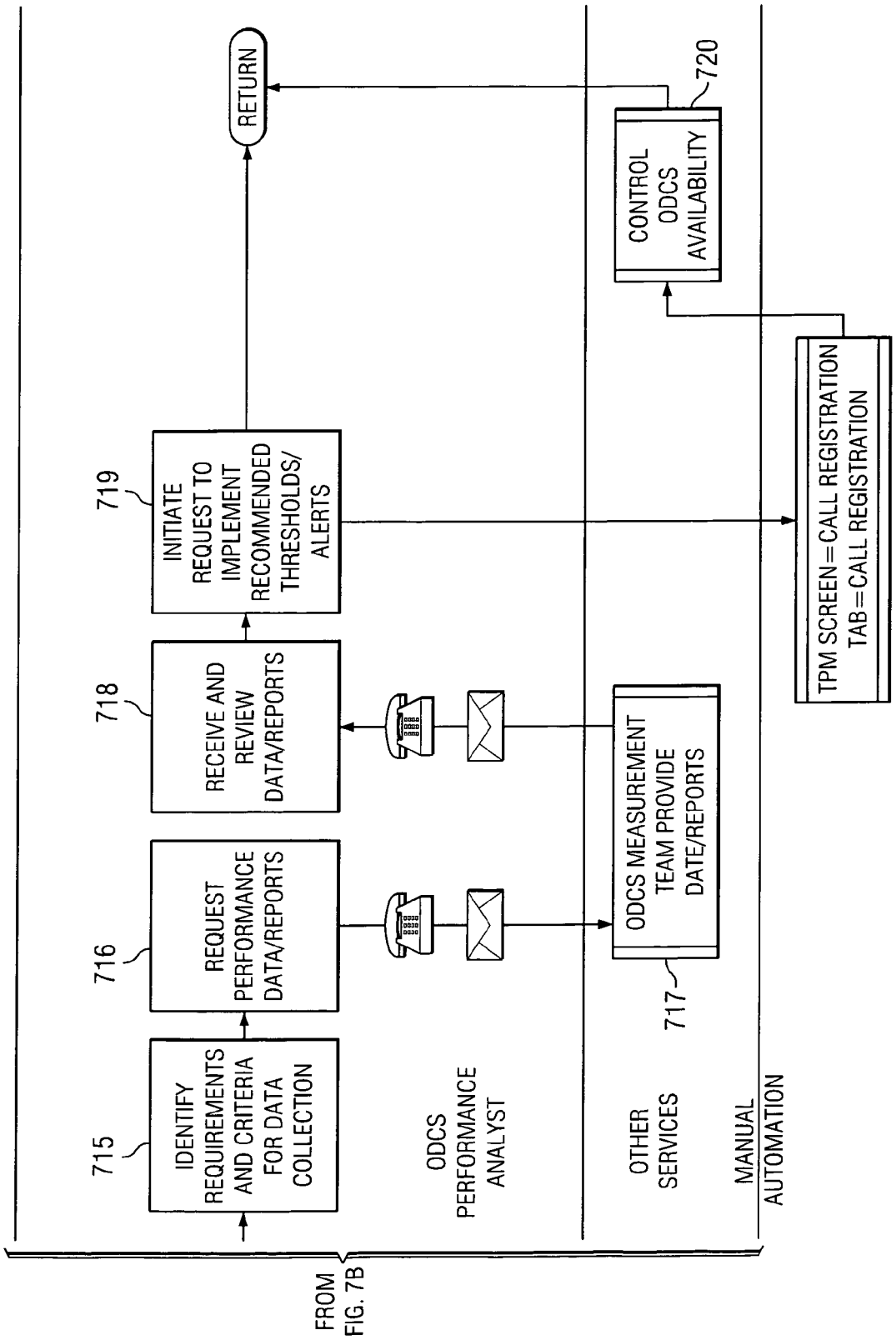

METHOD FOR SUPPORTING ON-DEMAND PERFORMANCE

CROSS-REFERENCE TO RELATED APPLICATION

The present invention is related to the subject matter of U.S. patent application Ser. No. 10/825,025 incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed invention relates generally to the field of resource management. More particularly, this invention relates to resource allocation in an on-demand, shared computing environment.

BACKGROUND OF THE INVENTION

For many years, information technology (IT) organizations (the "providers") have offered IT management services and computing resources to other business entities (the "customers"). In a "traditional" service model, the customers share a provider's management services, but each customer purchases or leases specific resources for the customer's exclusive benefit. The customer may purchase or lease the resources directly from the provider or from a third party. Regardless of their origins, though, such a purchase or lease may require extensive, time-consuming negotiations based upon the customer's anticipated requirements. If the customer's requirements are less than anticipated, then the customer effectively has wasted resources. If, however, the customer's requirements are greater than anticipated, then the customer may have to enter into additional time-consuming negotiations for the necessary resources.

Customers of "on-demand" services, on the other hand, share the provider's management services and computing resources (to the system and subsystem level), including persistent memory ("storage"), volatile memory ("memory"), and processors, as depicted in FIG. 1. As FIG. 1 also illustrates, another characteristic of the on-demand model is multiple customers sharing the same subsystem within the same computing resource, such as a logical partition (LPAR). In FIG. 1, for example, customer 3 and customer 4 could each run separate instances of operating system 3, such as Z/LINUX, on a single z/VM LPAR. Multiple external customers sharing singular hardware requires that performance tuning not only be applicable to the workload, but to the entire customer and the other customers sharing the hardware.

Generally, the on-demand provider delivers services based upon a contract that allows a variance of utilization. The provider delivers the requested services without regard to the physical resources used to provide those services. The customer does not purchase or lease the physical resources; instead, the provider retains the discretion to allocate the resources to logical partitions as needed to meet its service obligations. Typically, the provider establishes threshold levels of service that guide dynamic allocation of resources. Although on-demand customers may share a provider's services and computing resources, the provider generally must segregate and protect each customer's data.

While the on-demand service model addresses many of the problems of the traditional model, including wasted resources and time-consuming negotiations, it presents some unique problems of its own. Specifically, the on-demand provider must ensure that dynamic resource allocation does not interrupt any customer's service. The provider also must ensure that dynamic resource allocation for one customer does not negatively impact service performance or security for any other customer that shares the resources. Because the concept of dynamic resource allocation is foreign to the traditional service model, the traditional service management processes do not support these unique needs of the on-demand service model.

Therefore, one skilled in the art should appreciate the need for a detailed performance management method that allocates resources, at the system and subsystem level, in a dynamically shared computing environment, and ensures that the demands of one customer's applications are not affected by the allocation and utilization of the other customers who share these IT resources.

BRIEF SUMMARY OF THE INVENTION

The invention disclosed below, referred to herein as the "Performance Management method" (PMM), provides a method for managing the performance of computing resources in furtherance of delivering on-demand IT services to multiple customers. An IT service provider employs the Performance Management method when a customer requests a performance analysis, when performance issues are detected, when a review indicates a performance analysis is required, or when the level of threshold service must be established to create a service level agreement (SLA).

The inventive method comprises several distinct performance management sub-methods including: predictive performance management; preventative performance management; reactive performance management; and service level agreement (SLA) performance management. Collectively, these sub-methods define and maintain performance alerts, define performance report formats, balance and tune computing resources and workloads, analyze change requests from a performance perspective, collect performance statistics, respond to alerts, and manage the resolution of performance problems.

The Performance Management method thus enables an IT service provider to optimize response time and throughput of existing IT resources, and to minimize the impact of problems and changes on the performance of shared IT resources.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIGS. 2A and 2B provide an overview of the Performance Management method;

FIGS. 7A, 7B, and 7C illustrate the Service Level Agreement (SLA) Performance Management sub-method.

DETAILED DESCRIPTION OF THE PREFERRED EMBODIMENT

Figure 1:
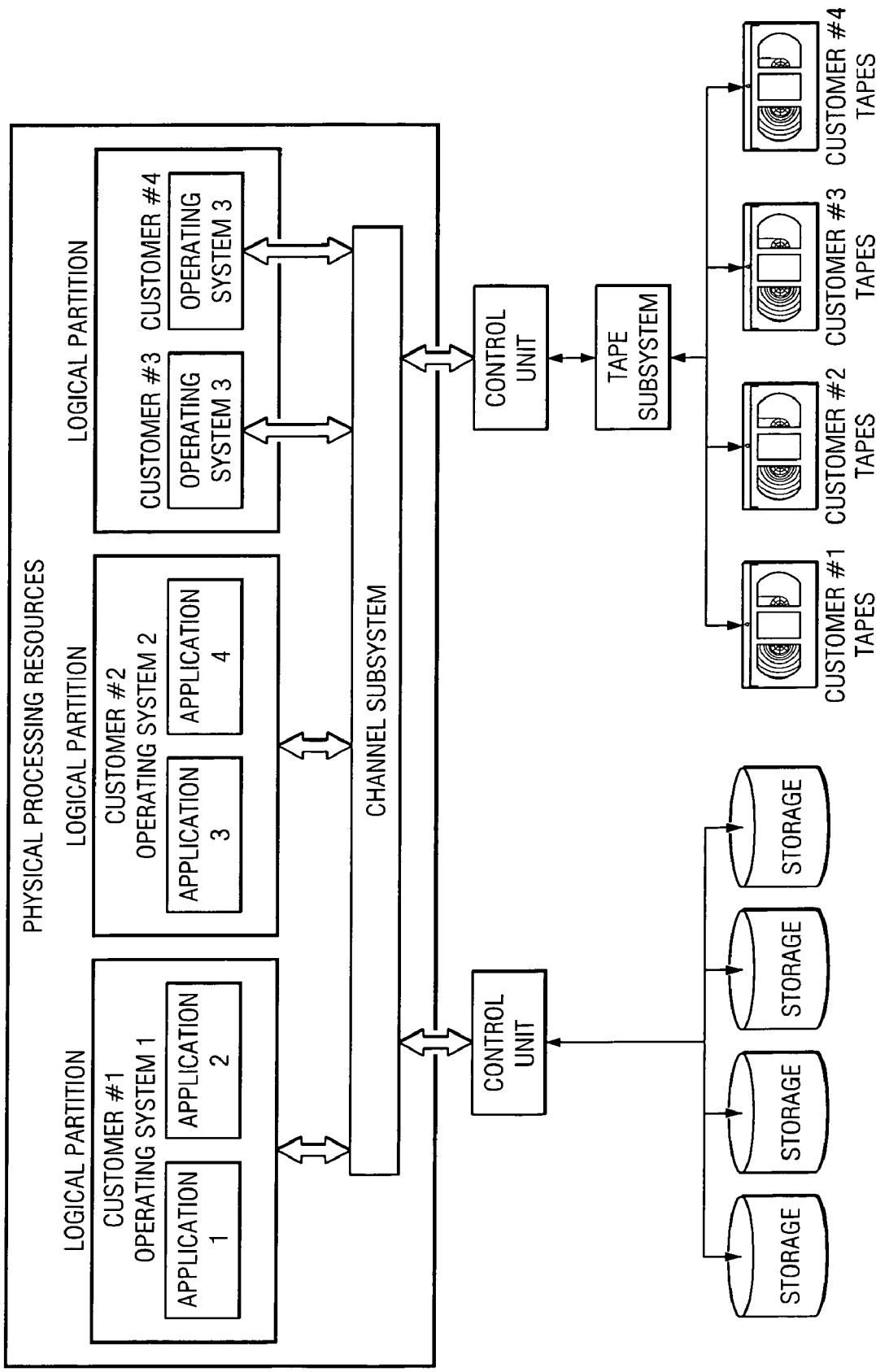
FIG. 1 illustrates an example shared resource configuration.

In the IT service industry, logical steps for delivering service often are organized into abstract "disciplines" that can be applied to any IT service delivery model. Within a given discipline, though, these steps are organized further into more narrow "processes," and finally, into detailed "methods." Thus, in this context, the invention described below comprises a "method" that applies IT service delivery disciplines to the new and unique needs of the on-demand model. Because this method has been designed to extend the reach of standard disciplines, some of the terms used in this description may be familiar to a person skilled in the art, but many of these terms are adapted to reflect the new and unique solutions that support the on-demand model.

The Performance Management method (PMM) is a tactical methodology that addresses the activities in which an on-demand provider defines and monitors performance parameters for a customer, thereby supporting each customer's performance within the on-demand environment. In this environment, the customers are boarded on shared platforms, where disk, tape, CPU and memory are shared by multiple customers. The method's goal is to optimize the response time and throughput of existing IT resources, as well as to enable appropriate actions to correct inefficient resource use.

Specifically, the method defines and maintains specific performance alerts for each customer in a shared environment, while being sensitive to the performance needs of all customers who share the environment. PMM includes alert definitions, requirements for performance reports, and activities for balancing and tuning the IT resources and the workload requirements. To accomplish this, the method comprises a proactive set of activities, which includes interpreting performance statistics, responding to alerts, and resolving performance problems.

The Performance Management method (PMM) has been designed as an integral part of a comprehensive "on-demand data center services (ODCS) delivery operational methods" (the "ODCS methods"). The ODCS methods encompass several other types of management methods, with which the PMM may interact. Since the PMM does not depend on the internal operations of these other management methods, they are characterized as "external" methods and described completely by the data that the PMM provides to and receives from them.

The ODCS methods that operate externally with the PMM include: 1) the Manage Change operational process, which opens a change record when requested by the PMM; 2) the Manage Problems operational process, which opens a problem record when requested by the PMM; 3) the Control ODCS Availability process, which implements recommendations when performance thresholds and reports are provided by the PMM; 4) the Supervise and Control ODCS methods, which provide completed requests, as submitted by the PMM, to assess, size, and implement required process improvements and to handle process compliance issues; 5) the Control ODCS Capacity process which, upon PMM's request, completes a request or implements a recommendation to other methods to correct performance issues; and 6) the Control ODCS Technology Strategy and Refresh process, which provides ODCS technology strategy when requested by the PMM.

In the detailed description that follows, the inventive Performance Management method is carried out by a Performance Analyst, unless otherwise indicated. The Performance Analyst interacts with all methods external to the PMM; with the provider's customers; with the internal users of the ODCS methods, such as account managers and other service delivery support staff; and with any other individuals requiring PMM data. The Performance Analyst has the overall responsibility of ensuring that performance service level agreements are met. Additionally, the Performance Analyst is responsible for overseeing and executing internal PMM operations.

For the sake of clarity, the references to a Performance Analyst assume that the Performance Analyst is an individual and that, unless otherwise indicated, the functions of the Performance Analyst are carried out manually. A person skilled in the art, though, will appreciate that many of the Performance Analyst's functions may be automated with routine programming, and the use of this nomenclature in the following description should not be construed as a limitation on the scope of the present invention.

To effectively implement the Performance Management method, a Performance Analyst must consider the dynamic demands of the various customer's applications sharing the IT resources, and the resources available to meet those demands. A person skilled in the art should appreciate that a Performance Analyst also must consider relevant policies, standards, and contracts when implementing the PMM.

The present invention can be implemented in many different configurations, including software, hardware, or any combination thereof. The following detailed description of the preferred embodiment and the accompanying figures refer to a variety of software tools that the Performance Analyst, or the related external operational methods, may use to implement the inventive method. In particular, the accompanying figures illustrate the use of problem management software, such as Tivoli Problem Management software (TPM), and change management software, such as Tivoli Change Management software (TCM). Additionally, a variety of reporting software tools are used including: ESM/RT; SRM for distribution of pre-defined reports; performance reporter (PR) for mainframe performance reports; RMF; and Omegamon Suite, which further includes CICS, DB2, IMS, and MVS, for most custom reports. A person skilled in the art should appreciate that a variety of software tools may be used to implement the inventive method, and the references to particular software tools are not intended to limit the scope of the invention. Furthermore, a person of skill in the art should be familiar with the various embodiments of particular software tools that are available in the market, and they are not described in detail here.

The following discussion and the accompanying figures also describe the use of a database in the preferred embodiment of the inventive method. A person of skill in the art will appreciate that a database may exist in many forms. As used herein, the term "database" means any collection of data stored together and organized for rapid search and retrieval, including without limitation flat file databases, fielded databases, full-text databases, object-oriented databases, and relational databases.

Figure 2A:
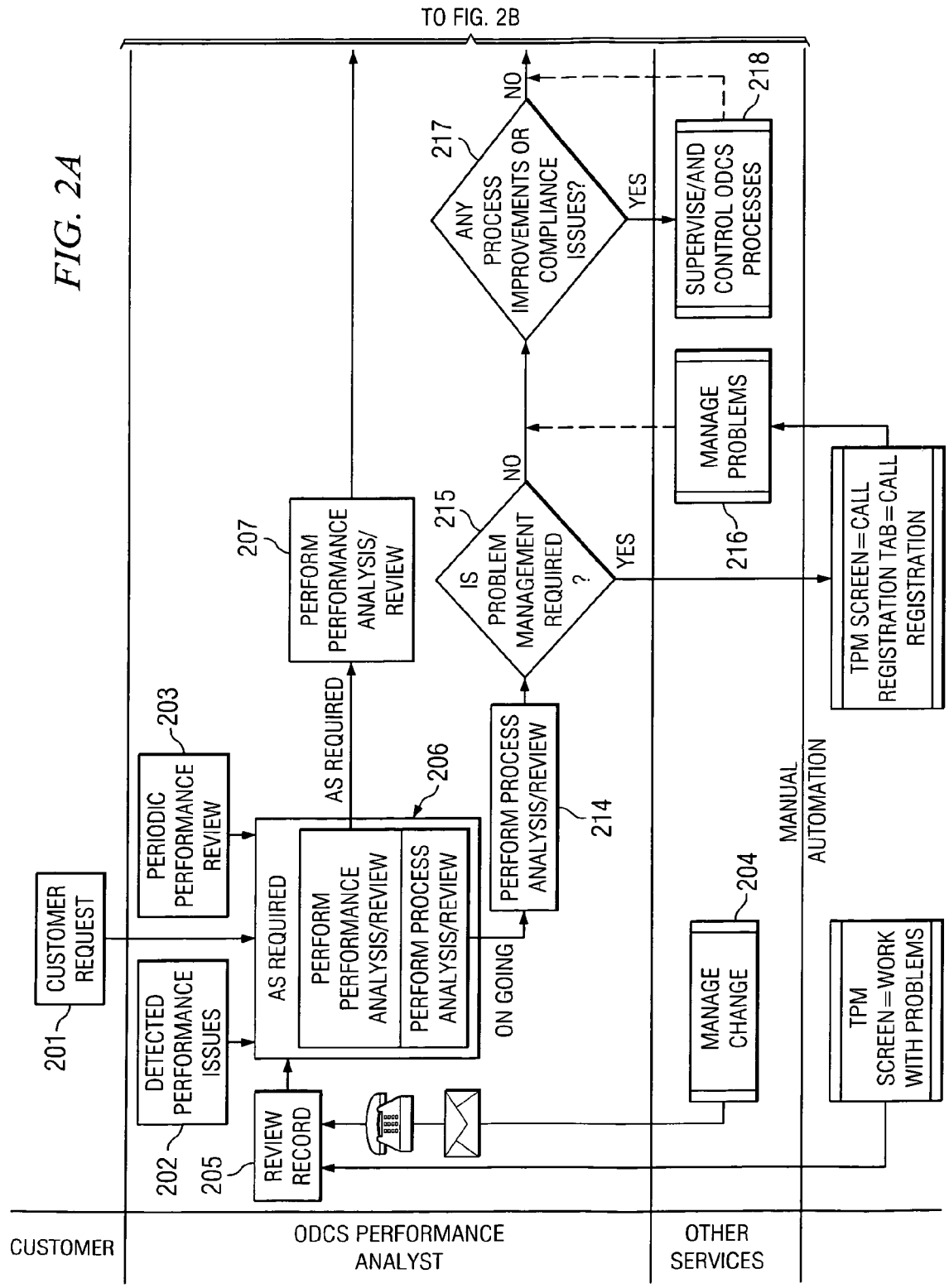

FIGS. 2A and 2B provide an overview of the Performance Management method (200). In accordance with FIG. 2A, the Performance Analyst invokes the PMM upon the request of a customer (201). The Performance Analyst also invokes the PMM when the Performance Analyst detects performance issues (202) or performs a comprehensive periodic performance review to ensure the overall system performance meets all objectives and no performance issues exist (203). If the Performance Analyst receives input, i.e., information or communications, from the Manage Change operational process, the Performance Analyst also invokes the PMM (204). Normally, the input from the Manage Change process consists of requests to review planned changes for performance impacts. The Performance Analyst then reviews the input record (205) to determine what is requested in order to proceed. As illustrated in FIG. 2A, the Performance Analyst selects the method path as required (206). To analyze and review the performance of the shared computing resources, the Performance Analyst selects the Performance Analysis/Review path (207). To analyze and review process results, the Process Analysis/Review path is selected. (214).

As illustrated in FIG. 2B, if the Performance Analyst selects the Perform Performance Analysis/Review path (207), the Performance Analyst further selects one of four discrete sub-methods (208). To review and monitor performance data, the Performance Analyst invokes the Predictive Performance Management sub-method 300 (see FIG. 3A) (209). To review planned events for performance impacts, the Performance Analyst invokes the Preventative Performance Management sub-method 400 (see FIG. 4) (210). The Performance Analyst invokes the Reactive Performance Management sub-method 500 (see FIG. 5A) to react to problem situations, such as a failing or poorly performing component, when prompted by a performance alert (211). If performance measurements, thresholds, or alerts need to be established or changed, the Performance Analyst invokes the Service Level Agreement Performance Management sub-method 700 (see FIG. 7A) (212 and 213). Each of these sub-methods is illustrated and discussed in detail below.

Referring again to FIG. 2A, the Performance Analyst invokes the Process Analysis Review to analyze capacity requests or issues, and to analyze unresolved escalation issues that require further attention (214). If a problem requires a more formal review (215), the Performance Analyst invokes the Manage Problems operational process to address the problem (216). If no formal review is required, the Performance Analyst then must determine if any improvements are needed (either to support the on-demand method or related processes), or if any method compliance issues were identified (217). If the Performance Analyst determines that method improvements are needed, or identifies any method compliance issues, the Performance Analyst invokes the Supervise and Control ODCS methods. Through this process, the Performance Analyst initiates assessment, sizing, and implementation of the process improvements and handles compliance issues (218). The Performance Management method is then completed (219), as indicated in FIG. 2B.

Figure 3A:
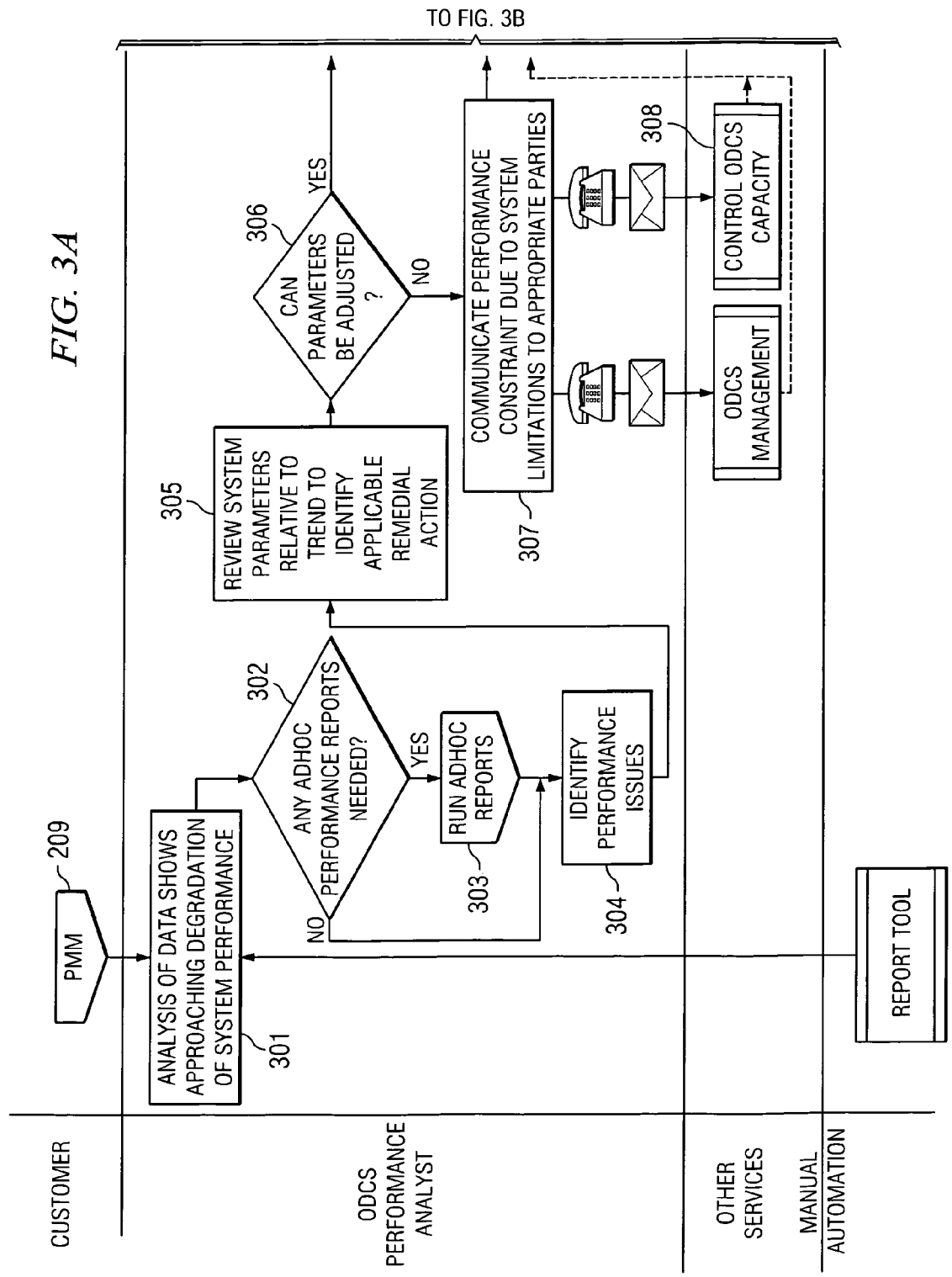
FIGS. 3A and 3B illustrate the Predictive Performance Management sub-method.
Figure 3B:
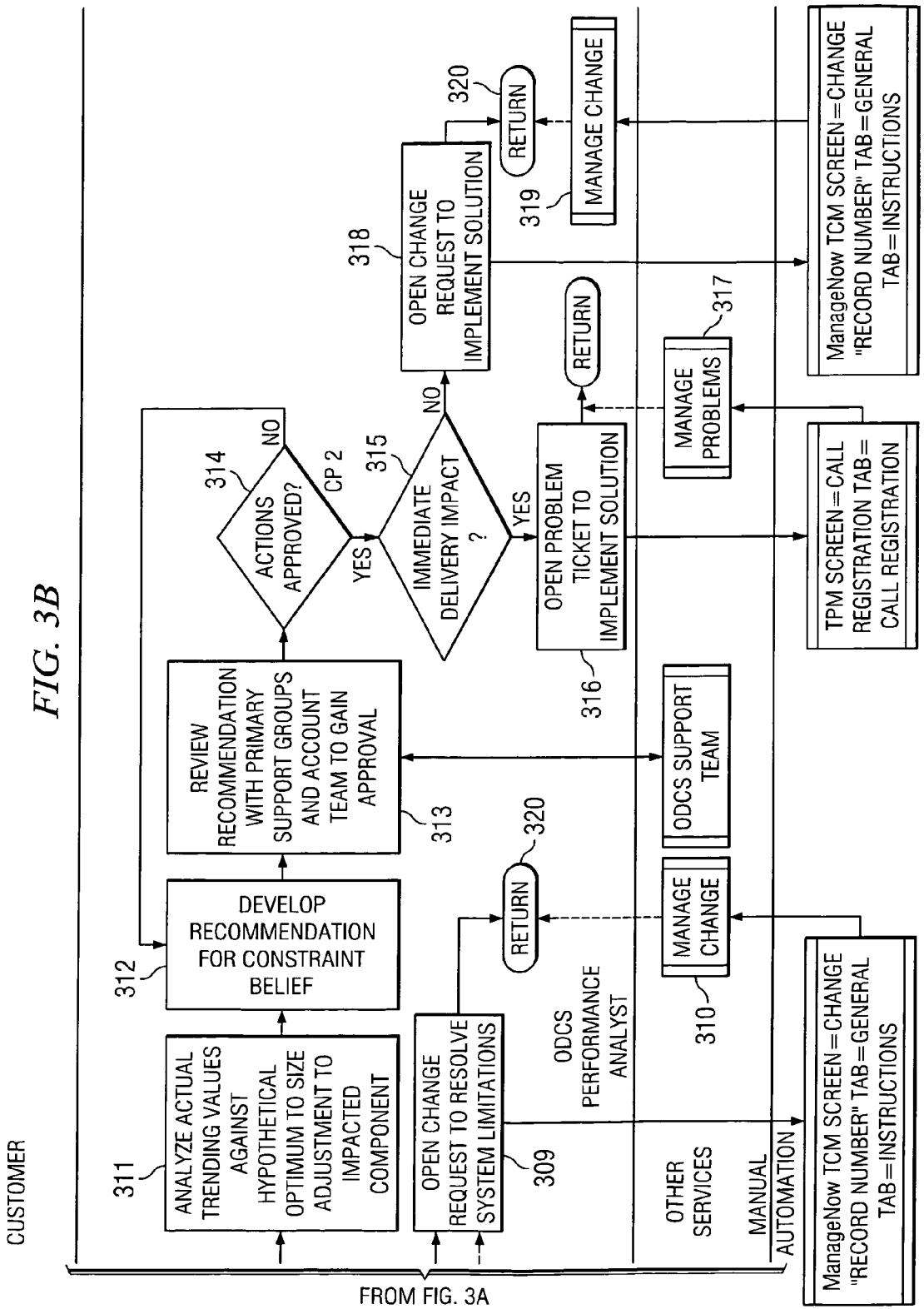

FIGS. 3A and 3B depict the Predictive Performance Management sub-method (300). This sub-method evaluates and monitors performance data in order to predict and minimize performance-related problems. No assumption is made that any specific problem exists. Instead, this sub-method analyzes trends in existing performance data to avoid potential performance problems.

The Performance Analyst invokes the Predictive Performance Management sub-method when a review of data shows approaching degradation in system performance (301). The Performance Analyst uses several methods to identify system performance degradation. For example, the Performance Analyst reviews system key indicator reports to examine the key performance indicators at both the system and subsystem levels. Key performance indicators show the utilization of critical system resources. The Performance Analyst isolates significant variables to determine key performance indicator exceptions, if any, and performs real-time monitoring of the system. The Performance Analyst also reviews the service level agreement metrics to identify system and subsystem performance degradation. The term "metrics" refers to numerical ratings used to measure the complexity and reliability of source code, the length and quality of the development process, and the performance of the application when completed.

If additional reports are required to analyze system and subsystem performance, the Performance Analyst invokes the Run Ad Hoc Reports sub-method, as detailed below, to request and receive the additional reports (302 and 303). If additional reports are not required, the Performance Analyst identifies performance issues by analyzing trends and exceptions observed in historical reports, as well as by identifying anomalies and specific metrics that indicate a potential performance problem (304). After reviewing system parameters that are relative to the trend, the Performance Analyst proposes an appropriate course of remedial action (305). The Performance Analyst then determines if system parameters can be adjusted without adverse effect to other customers who share the resources (306). If the parameters cannot be adjusted due to system limitations, the Performance Analyst communicates this information to ODCS Management and to the Control ODCS Capacity Process and requests assistance (307). The Performance Analyst alerts the Control ODCS Capacity Process that a change request is forthcoming to resolve system or subsystem limitation issues (308). A "Change Request to Resolve System Limitations" is opened to request that the system limitation issue be addressed to resolve the performance issue (309). The Performance Analyst likewise invokes the Manage Change operational process, which tracks the system limitation change through completion (310).

In contrast, if the Performance Analyst determines that the parameters of the system can be adjusted (306), the Performance Analyst analyzes the actual trending values against a hypothetical optimum to determine the correct adjustments needed to return the impacted component to an acceptable range while considering the impact to other customers sharing the resource (311). Based on the correct adjustment to the impacted component, the Performance Analyst develops a recommendation for constraint relief and presents the recommendation to the primary support groups and affected account teams for approval (312 and 313). If the support groups and account teams do not approve the recommendation, the Performance Analyst develops a new recommendation for constraint relief and again presents the recommendation to the primary support groups and affected account teams for approval (312 thru 314).

When the recommended actions are approved, the Performance Analyst determines if the performance issue causes an immediate delivery impact (315). If the performance issue causes an impact at this point, the Performance Analyst opens a problem ticket to implement the solution and invokes the Manage Problems operational process (316 and 317). If the performance issue does not cause an immediate delivery impact, the Performance Analyst opens a change request to implement the solution and invokes the Manage Change operational process to manage the change request to resolve the performance issue (318 and 319). The Predictive Performance Management sub-method then ends (320).

Figure 4A:
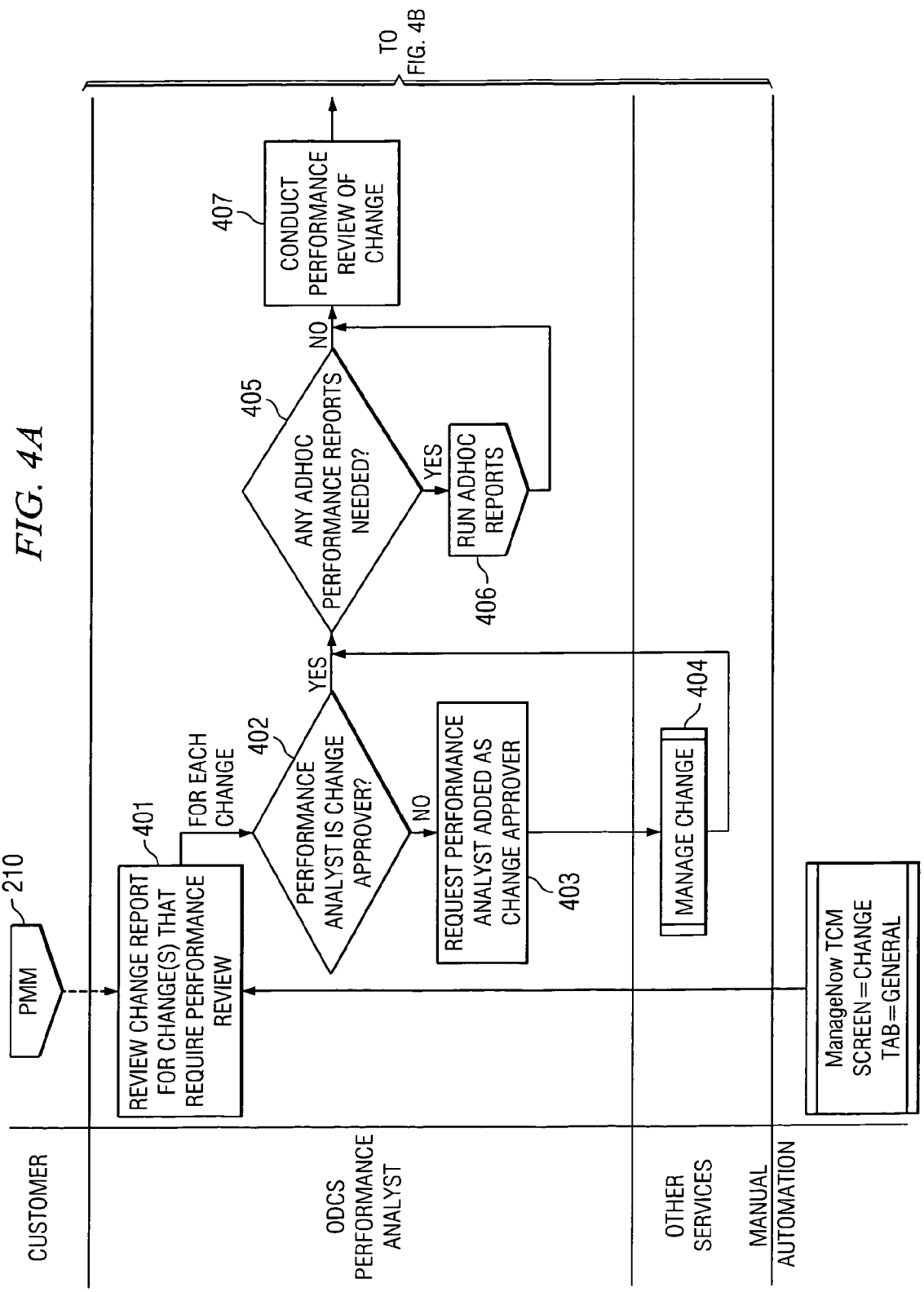
FIGS. 4A and 4B illustrate the Preventative Performance Management sub-method.
Figure 4B:
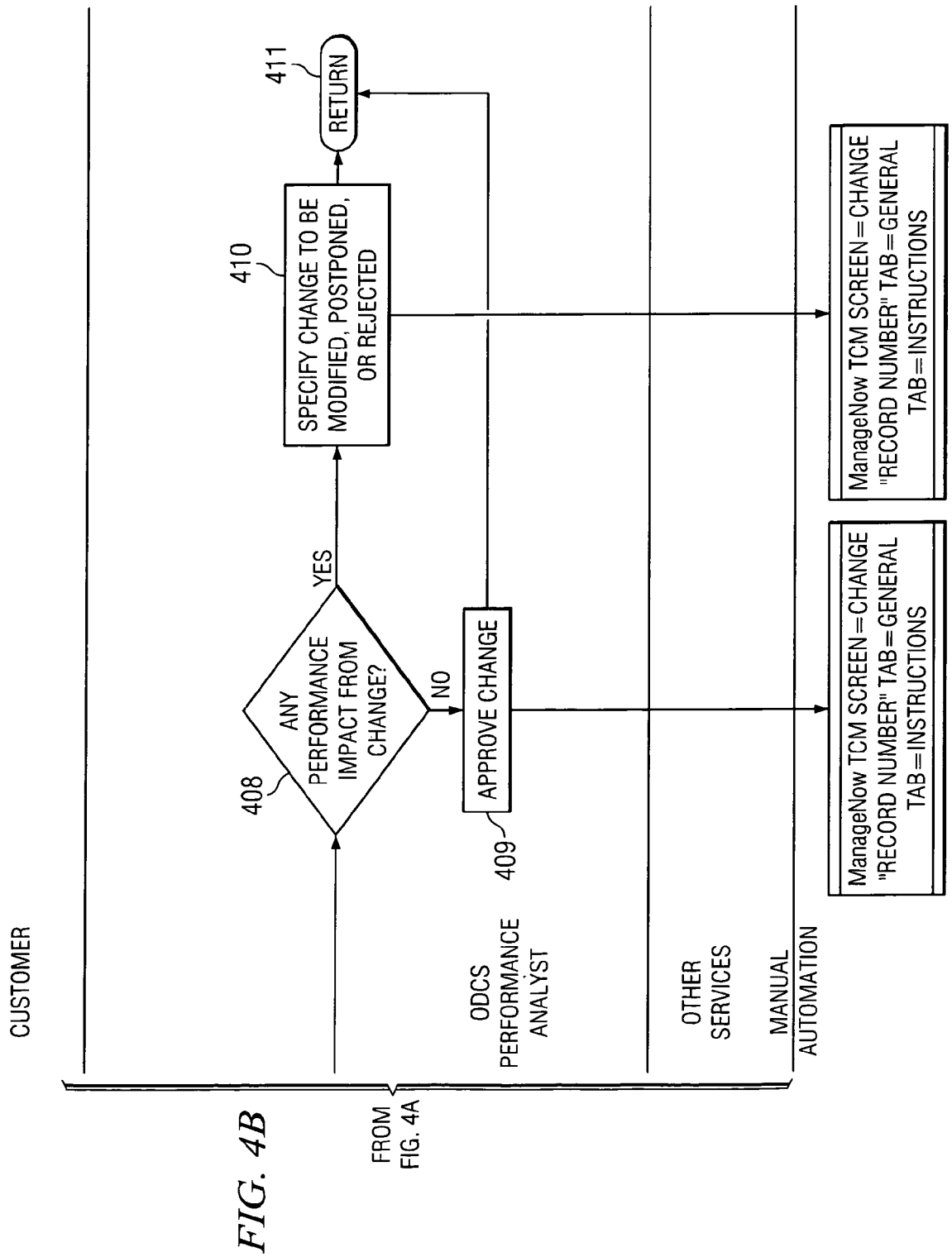

FIG. 4 illustrates the Preventative Performance Management sub-method 400. To effectively provide preventative performance management services to on-demand customers sharing IT resources, the Performance Analyst evaluates the impact of changes on the system as a means of avoiding negative performance effects. The effects of the changes, in terms of the potential impact on performance, result in accepting, rejecting, or conditionally approving the changes to avoid triggering performance problems.

The Performance Analyst invokes the Preventative Performance Management sub-method to review change reports and identify any changes that may impact performance (401). For each change that could potentially impact the system performance, the Performance Analyst must be listed as a Change Approver (402). If not listed as a Change Approver and the change could potentially impact the system performance, the Performance Analyst requests to be added as a Change Approver and the Manage Change process updates the change request to include the Performance Analyst (403 and 404). When listed as a Change Approver, the Performance Analyst obtains reports, as needed, by invoking the Run Ad Hoc Reports sub-method as described below (405 and 406).

The Performance Analyst, acting as a Change Approver, reviews the change record text in detail, analyzes the change for performance impacts, and determines if the change impacts the system performance (407 and 408). If the change does not impact the performance, the Performance Analyst approves the change (409). Otherwise, the Performance Analyst specifies that the change is modified, postponed, or rejected by updating the change record to document the review performed, the performance impacts found, and the performance recommendation for the change request (410). Upon this event, the Preventative Performance Management sub-method is complete and the Performance Management method continues.

Figure 5A:
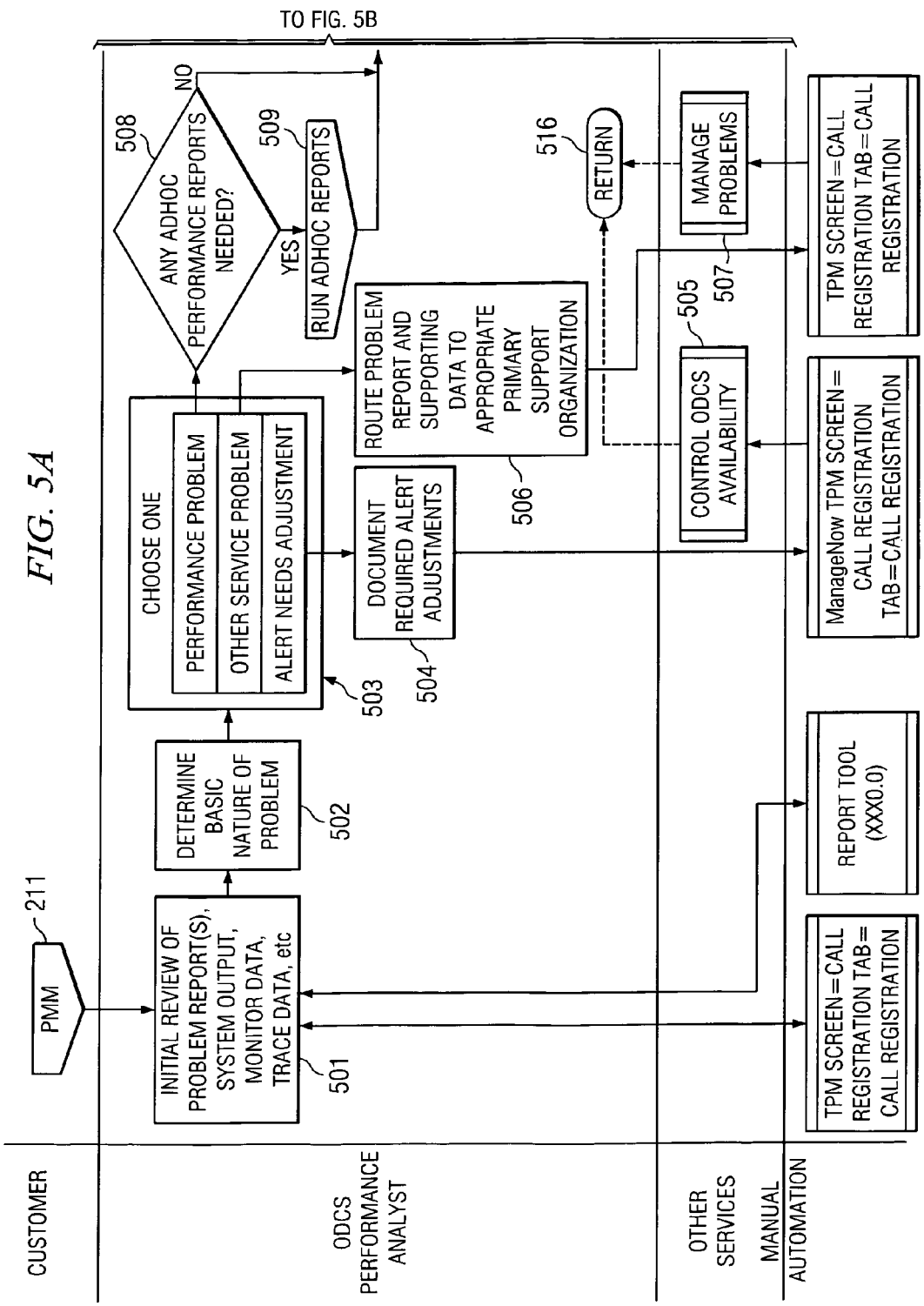
FIGS. 5A and 5B illustrate the Reactive Performance Management sub-method.
Figure 5B:
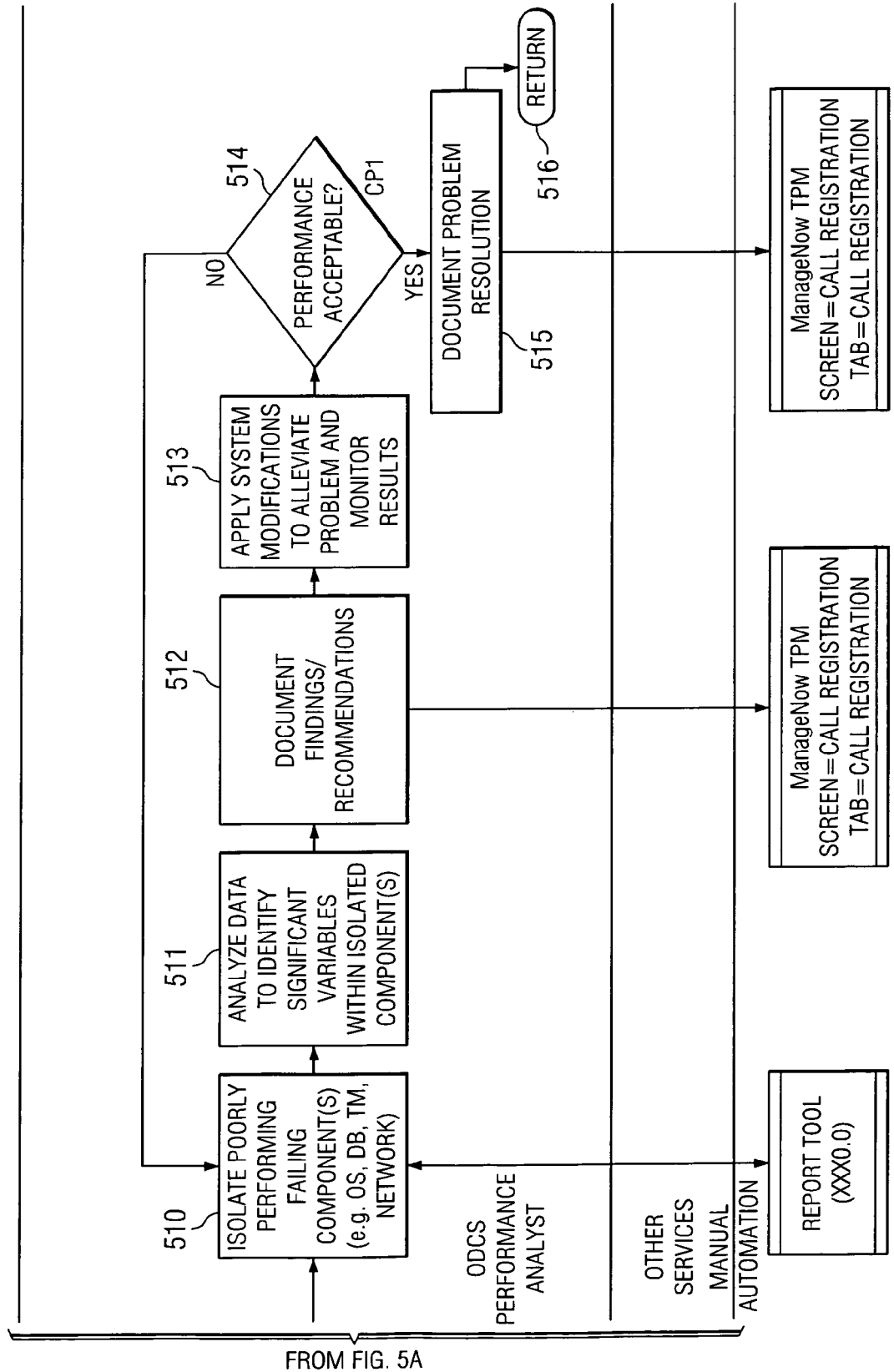

FIGS. 5A and 5B illustrate the Reactive Performance Management sub-method 500, which handles problem situations that are reactive in nature. When the Performance Analyst receives a performance alert, the Performance Analyst analyzes the problem and makes recommendations. This process continues until the specific problem is resolved with complete documentation. The Performance Analyst, invoking the Reactive Performance Management sub-method, collects all available data and performs a basic review of the problem (501). Data reviewed includes the initial problem reports, system outputs, monitor data, and trace data. The Performance Analyst then determines the nature of the problem (502). For instance, the problem may be performance related, may be an incorrect alert needing adjustment, or may be an issue that should be addressed by another group (503).

If the alert needs adjustment, the Performance Analyst opens a change request to document the alert changes needed to return the alert to compliance. The Performance Analyst then invokes the Control ODCS Availability operational process, an external process, to perform the requested alert adjustments (504 and 505).

If the nature of the problem is actually an issue that should be addressed by another service group, the Performance Analyst indicates in the documentation that the problem appropriately belongs to another primary support organization and routes the documentation to that organization (503 and 506). The external Manage Problems operational process reassigns the problem record to the appropriate support organization and tracks the problem record until the issue is resolved (507).

If the problem is performance related, the Performance Analyst determines if any additional reports or data are required to resolve the performance problem, and then invokes the Run Ad Hoc Reports sub-method, described in detail below (508 and 509). If no additional reports or data are needed, the Performance Analyst isolates the failing or poorly performing component (510). The problem component may lie with an operating system, a subsystem, a database, the network, or other components. The Performance Analyst identifies significant variables within the components previously isolated, and documents the findings and recommendations (511 and 512). The Performance Analyst implements system modifications to resolve the performance problem, monitors the failing component to ensure the results are acceptable, and determines whether or not the results are acceptable (513 and 514). If the results are not acceptable, the Performance Analyst repeats the analysis process to identify the failing component, formulate and document recommendations, and implement the modifications until acceptable results are obtained (510 thru 514). Once the Performance Analyst updates the problem record by documenting the problem found and the solution implemented, the Reactive Performance Management sub-method terminates and the Performance Management method continues (515 and 516).

Figure 6:
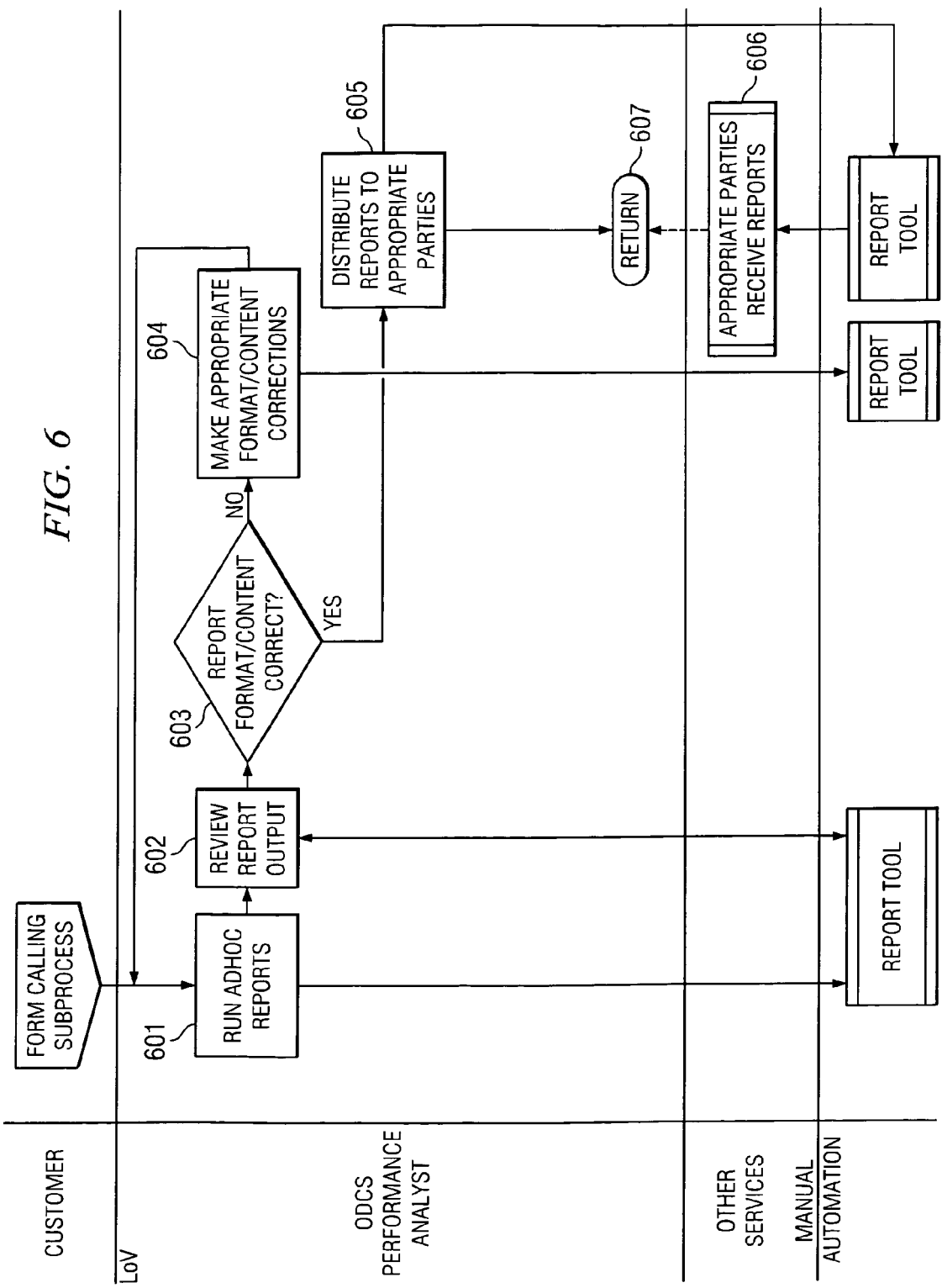
FIG. 6 illustrates the Run Ad Hoc Reports sub-method.

FIG. 6 illustrates the Run Ad Hoc Reports sub-method 600. The Performance Analyst invokes this sub-method, as needed, in the Predictive Performance Management sub-method (302 and 303), the Preventive Performance Management sub-method (405 and 406), and Reactive Performance Management sub-method (508 and 509). The Performance Analyst uses the Run Ad Hoc Reports sub-method to enter report specifications and produce individual reports to perform an in-depth analysis of a performance change or problem, or for future planning.

The Performance Analyst invokes the Run Ad Hoc Reports sub-method using the appropriate reporting tools (601). The Performance Analyst then reviews the report and determines if the format and content of the report are correct (602 and 603). If the format and content are not correct, then the Performance Analyst makes the required changes and re-runs the reports before distributing the reports to the appropriate parties (604 thru 606). As noted above, the Performance Analyst uses a variety of reporting tools in the preferred embodiment of the PMM's Run Ad Hoc Reports sub-method, but the invention should not be construed as being limited to these specific tools.

Figure 7A:
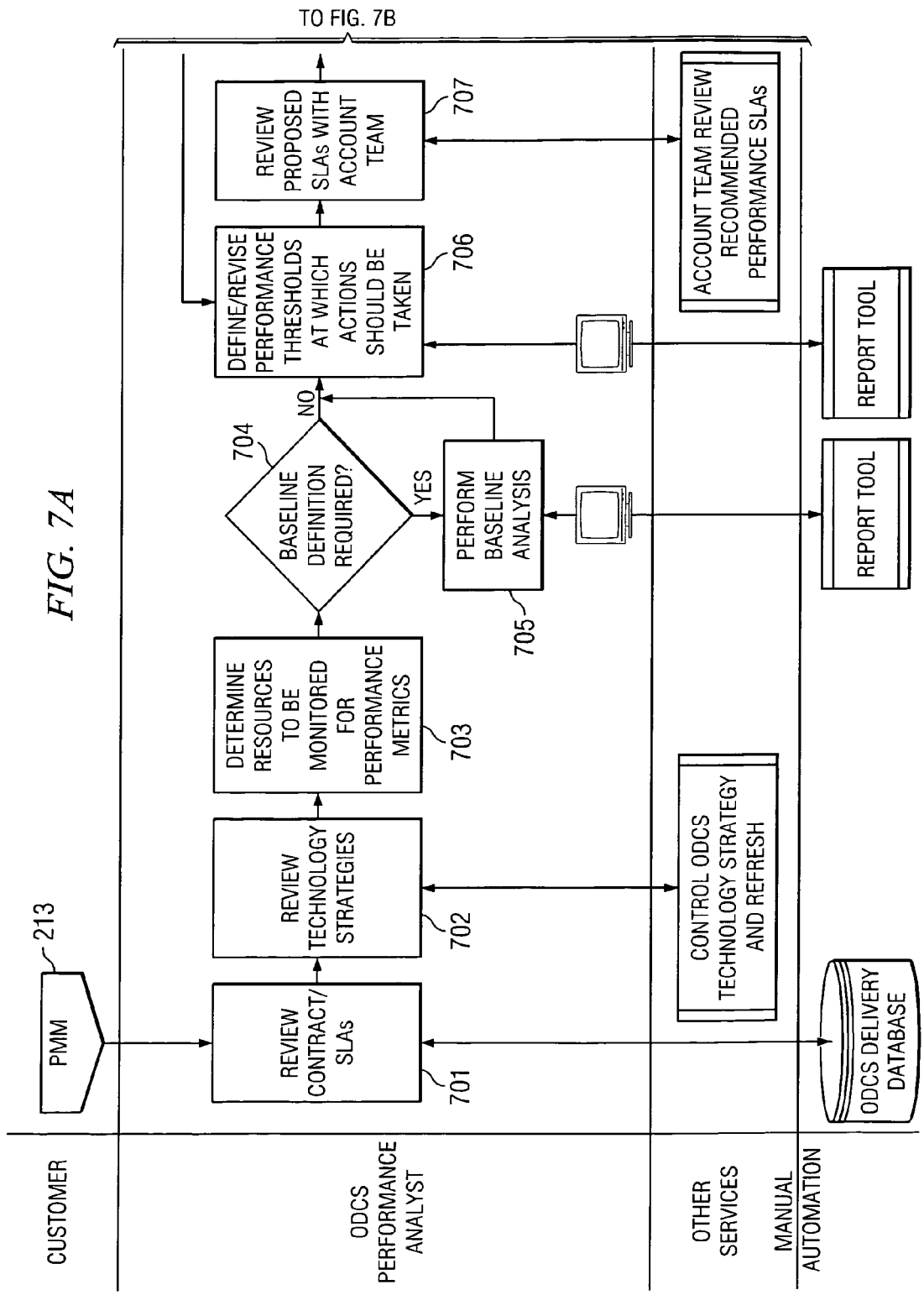

FIG. 7A depicts the Service Level Agreement (SLA) Management sub-method 700. The objectives of this method are to determine the appropriate SLA, to gain approval of the SLA, and to determine the measurements, alerts, and reports to ensure the SLA requirements are achieved. The Performance Analyst invokes the SLA sub-method when performing SLA related tasks. The Performance Analyst may perform these SLA related tasks independently of the other sub-methods. Additionally, the Performance Analyst may perform these SLA related tasks in response to changes initiated during the Preventative Performance Management sub-method or the Reactive Performance Management sub-method.

In the SLA Performance Management sub-method, the Performance Analyst first accesses and reviews the applicable contracts and the required SLAs (701). As seen in FIG. 7, a customer's contract and SLA information is typically stored in database 750 to facilitate retrieval. Additionally, the Performance Analyst accesses and reviews a technology strategy for performance related matters (702). The technology strategy is based upon the performance data provided by the Control ODCS Technology Strategy and Refresh operational process. The Performance Analyst then determines the resources that should be monitored for performance metrics (703). System performance has many dimensions to be considered, including throughput, latency, utilization, efficiency, and effectiveness. Typical system resources and components that should be monitored include CPU, memory, disk, network, and system applications. Of course, the Performance Analyst always should consider how the performance of these system resources affects customers that share the resources. Next, the Performance Analyst determines if a baseline definition is required, and, if so, analyzes the baseline using an automated report tool (704 and 705). The baseline is dependent upon many different factors, such as the systems, subsystems, applications, other customers, and performance measurement tools used. Next, the Performance Analyst defines and reviews the performance thresholds that should trigger action. The performance thresholds definitions are based on contract and SLA obligations, as well as the platform, operating system, subsystems, environment, and system role in the process (706).

Figure 7B:
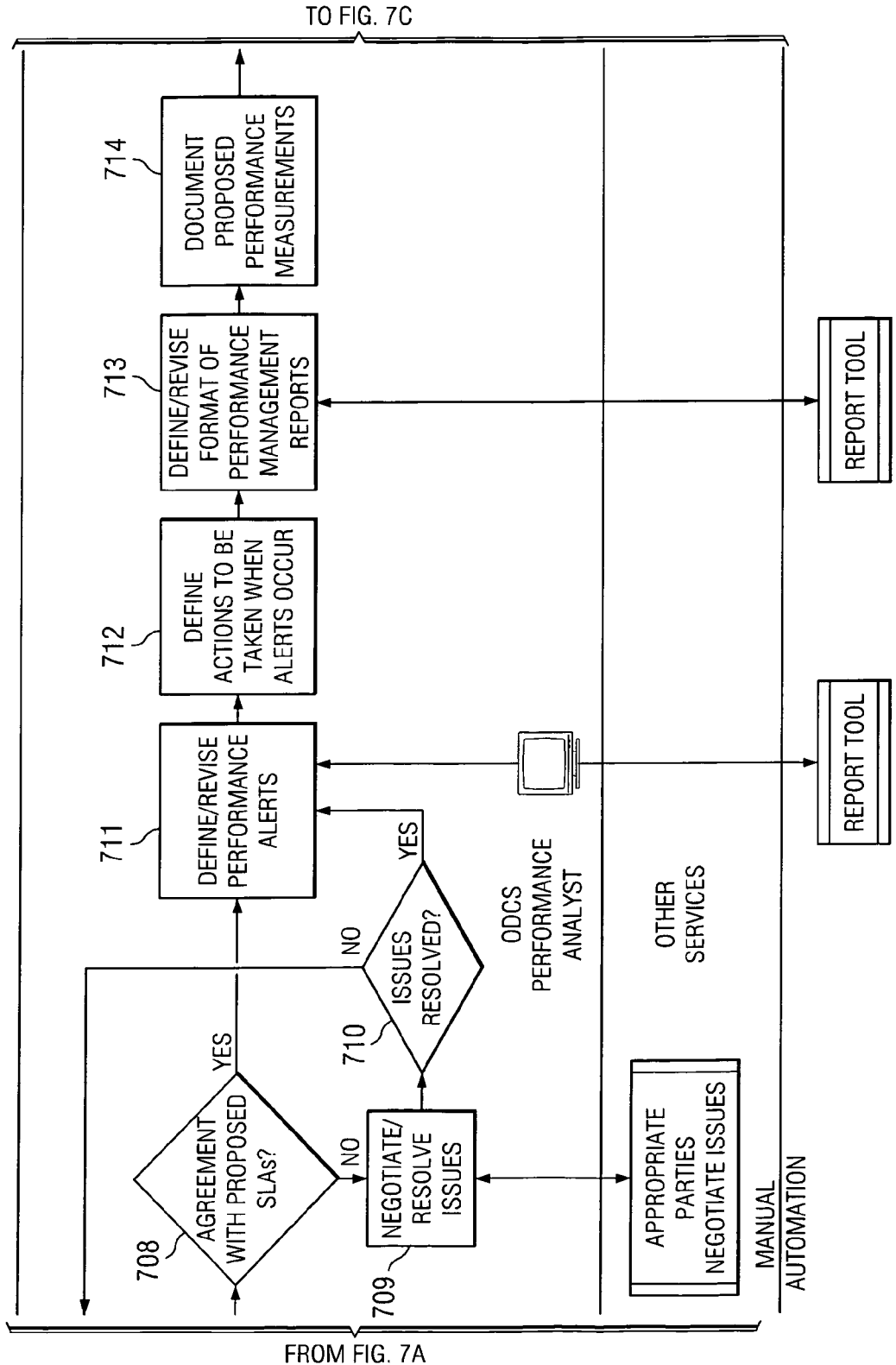

Continuing with FIG. 7B, the Performance Analyst reviews the proposed SLAs with the account team to ensure the SLAs are acceptable and meet contractual requirements (707 and 708). If the account team does not agree with the proposed SLAs, the account team and Performance Analyst must negotiate and resolve the conflicts before the Performance Analyst may revise the performance thresholds (708 thru 710). When the account team agrees with the proposed SLAs, the Performance Analyst defines and updates the performance alerts (708 and 711). Performance alerts occur when performance metrics cross the defined thresholds. The Performance Analyst may take several actions when a performance alert occurs, including analyzing performance problems, tuning the system, and invoking capacity planning (712). The Performance Analyst, aided by a reporting tool, defines and reviews the format of performance management reports (713). These reports may be in the form of text, tables, graphs, raw data, etc. The types of reports include technical reviews, executive summaries, and presentations. The Performance Analyst documents all proposed performance measurements and their interrelationships, and includes the SLAs, alerts and responses, and performance reports in the documentation (714).

Referring to FIG. 7C, the Performance Analyst identifies requirements and criteria for data collection, which may include the type of data to be collected and the length of time that the data must be retained (715). Next, the Performance Analyst submits requests to the ODCS Measurements Team to collect the required performance data, the report criteria, and the frequency for producing performance reports (716). The ODCS Measurement Team obtains the data collection and report request from the Performance Analyst, and develops the data collection jobs and procedures. The ODCS Measurement Team also provides samples of the data and reports to validate the request (717). Then, the Performance Analyst receives and reviews the reports to ensure that the requirements are met. The Performance Analyst submits a change request to the Availability group to implement the thresholds and develop or update the alerts (718 and 719). When the Performance Analyst invokes the Control ODCS Availability operational process to implement the new or updated thresholds (720), the Performance SLA Management sub-method ends and the Performance Management method continues.

A preferred form of the invention has been shown in the drawings and described above, but variations in the preferred form will be apparent to those skilled in the art. The preceding description is for illustrative purposes only, and the invention should not be construed as limited to the specific form shown and described. The scope of the invention should be limited only by the language of the following claims.

What is claimed is:

1. A method for managing the performance of an on-demand, shared computing system, at the system and subsystem level, the method comprising:
    managing the performance of the on-demand, shared computing system by a computer having at least one processor executing programming instructions to perform steps comprising:
        monitoring a plurality of performance data;
        analyzing the plurality of performance data to identify a performance trend;
        identifying an approaching performance degradation in the performance trend;
        identifying a component of the on-demand, shared computing system that the approaching performance degradation impacts;
        identifying a performance parameter of the on-demand, shared computing system that impacts the component;
        determining if a system limitation constrains an adjustment of the performance parameter;
        responsive to determining that the system limitation does not constrain the adjustment of the performance parameter, comparing the performance trend with a hypothetical optimum performance trend to identify a correct adjustment to the performance parameter needed to return the component to acceptable performance;
        creating a recommendation indicating the correct adjustment to the performance parameter, and forwarding the recommendation to an appropriate party;
        responsive to receiving approval of the recommendation from the appropriate party, implementing the recommendation to resolve the approaching performance degradation; and
        responsive to determining that the system limitation does constrain the adjustment of the performance parameter, communicating the system limitation to the appropriate party, and opening a change request to resolve the limitation.

2. A method for reacting to an alert in a shared computing system, the process comprising:
    reacting to the alert in the shared computing system by a computer having at least one processor executing programming instructions to perform steps comprising:
        determining if the alert is a performance alert;
        responsive to determining the alert is not a performance alert identifying a service group that should receive the alert, and routing the alert to the service group;
        responsive to determining that the alert is a performance alert, determining if the performance alert is valid;
        responsive to determining the performance alert is invalid, creating a documentation of the performance alert being invalid and forwarding the documentation to a Performance Analyst;
        responsive to determining the performance alert is valid, determining if additional data is required to evaluate the performance alert;
        responsive to determining that additional data is required to evaluate the performance alert, generating an ad hoc report containing the additional data;
        identifying a component of the shared computing system that caused the performance alert,
        identifying a variable in the component that caused the performance alert, modifying the variable to resolve the performance alert, and monitoring the component to ensure the performance alert is resolved.

3. A process for managing the performance of resources in a shared computing system to meet requirements of a contract governing a service level agreement, the process comprising:

reviewing the contract, the service level agreement, and a technology strategy, wherein the service level agreement is stored in an object-oriented database;

identifying a performance parameter to be monitored for ensuring that the service level agreement is satisfied;

establishing a performance baseline for the performance parameter;

defining a performance threshold, based on the performance parameter and the performance baseline, for alerting a Performance Analyst when a performance parameter crosses the performance threshold;

gaining approval for the performance threshold from an account team to ensure the service level agreement satisfies the requirements of the contract;

defining a performance alert and a response to the performance alert;

incorporating the defined performance alert, the performance threshold, and the response into the service level agreement; and monitoring the system performance to ensure the requirements of the service level agreement are satisfied, by a computer having at least one processor executing programming instructions to perform steps comprising:

establishing data collection requirements;

collecting and reporting data according to the data collection requirements;

receiving and reviewing the data collected; and changing the performance alert and the performance threshold to meet the requirements of the service level agreement.

\* \* \* \* \*